(12) United States Patent
Kosel et al.

(10) Patent No.: US 11,099,155 B2
(45) Date of Patent: Aug. 24, 2021

(54) CORROSION DETECTION OF NANOWIRES BY MAGNETIC SENSORS

(71) Applicant: KING ABDULLAH UNIVERSITY OF SCIENCE AND TECHNOLOGY, Thuwal (SA)

(72) Inventors: Jürgen Kosel, Thuwal (SA); Selma Amara, Thuwal (SA); Iurii Ivanov, Thuwal (SA); Mario Blanco, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 766 days.

(21) Appl. No.: 15/478,507

(22) Filed: Apr. 4, 2017

(65) Prior Publication Data

US 2017/0284966 A1 Oct. 5, 2017

Related U.S. Application Data

(60) Provisional application No. 62/318,031, filed on Apr. 4, 2016.

(51) Int. Cl.
*G01N 27/82* (2006.01)
*G01N 17/04* (2006.01)

(52) U.S. Cl.
CPC ............ *G01N 27/82* (2013.01); *G01N 17/04* (2013.01)

(58) Field of Classification Search
CPC ........... G01N 17/00; G01N 17/04–046; G01N 27/72; G01N 27/82–9093; B82Y 25/00
See application file for complete search history.

(56) References Cited

U.S. PATENT DOCUMENTS

| 5,126,654 A * | 6/1992 | Murphy | G01N 17/02 204/196.06 |
| 6,492,808 B1 * | 12/2002 | Sukhorukov | G01B 7/32 324/235 |
| 6,628,111 B2 * | 9/2003 | Shapiro | G01N 17/006 324/700 |
| 6,833,980 B1 * | 12/2004 | Tsukagoshi | B82Y 10/00 324/252 |
| RE40,166 E * | 3/2008 | Sukhorukov | G01N 27/82 324/235 |
| 8,072,711 B1 * | 12/2011 | Wang | B82Y 25/00 360/324 |
| 9,103,654 B1 * | 8/2015 | Cox | G01B 7/14 |
| 2004/0055391 A1 * | 3/2004 | Douglas | G01N 17/046 73/779 |
| 2004/0091744 A1 * | 5/2004 | Carey | B82Y 10/00 428/811.1 |
| 2005/0100930 A1 * | 5/2005 | Wang | B82Y 5/00 435/6.12 |

(Continued)

*Primary Examiner* — Huy Q Phan
*Assistant Examiner* — David B Frederiksen
(74) *Attorney, Agent, or Firm* — Patent Portfolio Builders PLLC

(57) ABSTRACT

Disclosed are various embodiments related to a corrosion detection device for detecting corrosive environments. A corrosion detection device comprises a magnetic sensor and at least one magnetic nanowire disposed on the magnetic sensor. The magnetic sensor is configured to detect corrosion of the one or more magnetic nanowires based at least in part on a magnetic field of the one or more magnetic nanowires.

20 Claims, 4 Drawing Sheets

(56) References Cited

U.S. PATENT DOCUMENTS

| | | | | |
|---|---|---|---|---|
| 2009/0134867 A1* | 5/2009 | Hatanaka | ............... | G01N 27/83 |
| | | | | 324/229 |
| 2009/0223833 A1* | 9/2009 | Forsyth | ................. | G01N 17/04 |
| | | | | 205/776.5 |
| 2009/0224341 A1* | 9/2009 | Li | ........................ | B82Y 25/00 |
| | | | | 257/421 |
| 2009/0260719 A1* | 10/2009 | Iben | ....................... | B82Y 25/00 |
| | | | | 148/122 |
| 2010/0097058 A1* | 4/2010 | Getty | ..................... | G01R 33/04 |
| | | | | 324/244 |
| 2010/0308818 A1* | 12/2010 | Ceschini | .............. | G01N 27/902 |
| | | | | 324/307 |
| 2011/0012628 A1* | 1/2011 | Dobashi | ................ | G01N 17/02 |
| | | | | 324/700 |
| 2012/0038377 A1* | 2/2012 | Hamann | ................ | G01N 17/04 |
| | | | | 324/700 |
| 2012/0177811 A1* | 7/2012 | Hefner | ................... | G01N 17/04 |
| | | | | 427/9 |
| 2012/0256522 A1* | 10/2012 | Ito | ....................... | G01R 33/0052 |
| | | | | 310/313 B |
| 2013/0076347 A1* | 3/2013 | Toshida | ................. | G01R 33/10 |
| | | | | 324/219 |
| 2014/0110763 A1* | 4/2014 | Song | .................... | G01N 29/022 |
| | | | | 257/252 |
| 2014/0173786 A1* | 6/2014 | Flanders | ................ | G01Q 60/40 |
| | | | | 850/40 |
| 2016/0018382 A1* | 1/2016 | Worden | ............. | G01N 33/2888 |
| | | | | 73/53.05 |
| 2016/0291097 A1* | 10/2016 | Kuo | ..................... | G01R 33/098 |

\* cited by examiner

CORROSION DETECTION OF NANOWIRES BY MAGNETIC SENSORS

CROSS-REFERENCE TO RELATED APPLICATIONS

This application claims priority to and the benefit of provisional application entitled, "Corrosion Detection of Nanowires by Magnetic Sensors" having Ser. No. 62/318,031, filed Apr. 4, 2016, which is incorporated herein by reference in its entirety.

BACKGROUND

Corrosion is the natural process by which metals, due to the environment to which they are exposed, revert to more chemically stable oxides. Corrosion detection is typically based on the measurement of the electrical resistance of a thin strip of metal, which is affected by the exposure to the surrounding environment, the accumulation of corrosion damage over time, and the rate of corrosion. For example, as the metal strip corrodes and becomes thinner, the resistance of the metal strip increases.

SUMMARY

Included are various embodiments of systems and methods related to a corrosion detection device for detecting corrosive environments. One embodiment of a system, among others, includes a corrosion detection device comprising a magnetic sensor and one or more magnetic nanowires disposed on the magnetic sensor, wherein the magnetic sensor is configured to detect corrosion of the one or more magnetic nanowires based at least in part on a magnetic field of the one or more magnetic nanowires.

Another embodiment of a method, among others, includes a method for detecting corrosion, the method comprising placing one or more magnetic nanowires on a magnetic sensor to form a corrosion detection device; attaching the corrosion detection device to a material structure; obtaining one or more outputs of the magnetic sensor; determining corrosion of the one or more magnetic nanowires based at least in part on the one or more outputs, wherein a magnetization of the one or more magnetic nanowires decreases as the one or more magnetic nanowires corrodes; and determining that a surrounding environment of the material structure is a corrosive environment based at least in part on the corrosion of the one or more magnetic nanowires.

One embodiment of a system, among others, includes a system for detecting corrosion, the system comprising a material structure and a correction detection device attached to the material structure, the correction detection device comprising: a magnetic sensor; and at least one nanowire coupled to the magnetic sensor, the magnetic sensor being configured to detect corrosion of the at least one nanowire, and the output of the magnetic sensor being a function of a corrosiveness of a surrounding environment of the material structure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A and 2B are images of the magnetic nanowires prior to heat treatment. FIGS. 2C and 2D are images of the magnetic nanowires after the heat treatment in air.

DETAILED DESCRIPTION

Disclosed herein are various embodiments related to a corrosion detection device for detecting corrosive environments. Specifically, the present invention relates to a corrosion detection device, where the device is designed to detect corrosive environments based on the detection of corrosion of nanomaterials via magnetic sensors.

A corrosive environment contains one or more substances capable of destroying, reacting, or damaging other substances with which it comes into contact. A corrosive environment can attack a great variety of materials, including metals and various organic compounds, but for safety purposes corrosiveness is mostly concerned with its effects on living tissue: an environment that causes chemical burns on contact.

According to various embodiments of the present disclosure, the corrosion detection device is designed to monitor the integrity of a material structure containing iron or steel elements. Examples of material structures are commonplace in the construction of buildings, bridges, wharfs, damns, and utility towers, and include, e.g., support beams, cables and other load or strain bearing structures. In some embodiments, the corrosion detection device can be used on exposed surfaces of the material structure. In other embodiments, the corrosion detection device can be embedded within the material structure (e.g., in a cement matrix of a concrete structure). Additional applications of the corrosion detection devices can include water, oil & gas pipes, chemical storage tanks, distillation columns and reactors.

Figure 1:
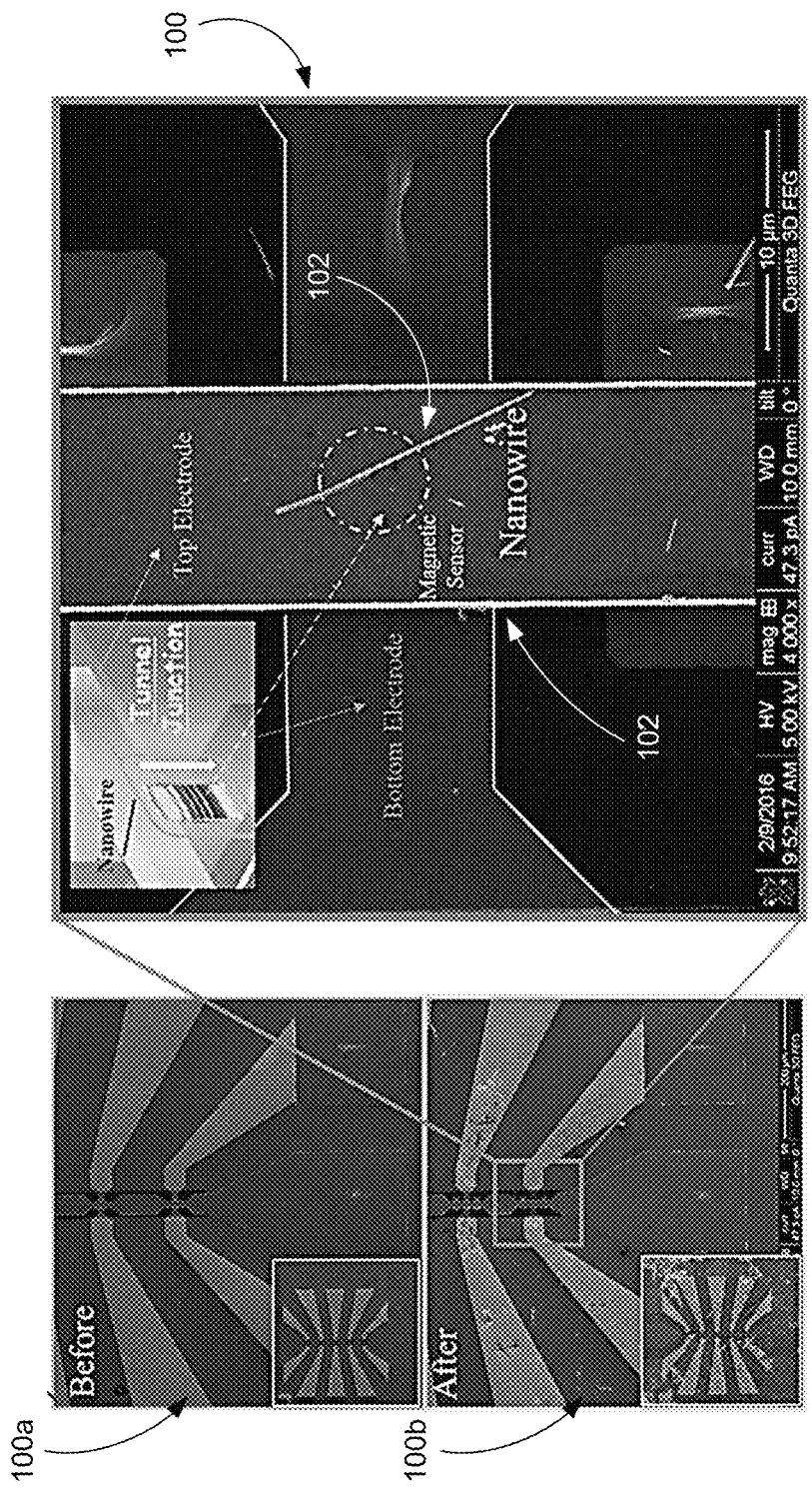
FIG. 1 is a scanning electron microscopy image illustrating an example of a corrosion detection device, in accordance with various embodiments of the present disclosure.

Referring to FIG. 1, shown is an example of an electron microscopy image of the corrosion detection device 100 (e.g., 100a, 100b) according to various embodiments of the present disclosure. The corrosion detection device 100 comprises magnetic nanowires 102 disposed on a magnetic sensor 104. The magnetic nanowires 102 can comprise iron nanowires, nickel nanowires, cobalt nanowires, alloy nanowires, and/or any other type of magnetic nanowire that can optimize the performance as will be appreciated. According to various embodiments, the magnetic nanowires 102 can be fabricated by electrodeposition inside nanoporous templates, released from templates by chemical etching, dispersed in ethanol, and then transferred onto the magnetic sensors by means of a microliter size drop of ethanol with the given concentration of magnetic nanowires. After transferring, the nanowires 102 are fully magnetized due to the shape anisotropy. In some embodiments, the magnetic nanowires 102 can be uniformly magnetized by applying once a magnetic field of >100 mT. In some embodiments, the magnetic nanowires 102 can be produced directly on the magnetic sensors 104.

The magnetic sensor 104 can comprise a tunnel junction, a magnetoresistance sensor, a magnetoimpedance sensor, a hall sensor, and/or any other type of magnetic sensor. The use of the magnetic sensor 104 enables optimization for specific needs such as, for example, wireless operation (e.g., radio-frequency identification (RFID), surface acoustic wave, etc.), low power consumption, low production costs and/or other types of needs as can be appreciated.

According to various embodiments, the magnetic nanowires 102 produce a magnetic field that is detected by the magnetic field sensor 104. In one non-limiting example, assume the magnetic nanowires 102 comprise iron nanowires. In a corrosive environment, the iron nanowires will be transformed into core/shell nanowires with an iron core and iron oxide shell. While the iron nanowires remain in the corrosive environment, the iron core will be consumed until it completely vanishes. During this process, the magnetization of the nanowires decreases. As such, the reading of the magnetic sensor is a function of the corrosiveness of the environment. According to various embodiments of the present disclosure, various environmental parameters can be detected, such as, for example, heat, humidity, chemicals in the corrosive environment (e.g., chloride: chlorine, $Cl_2$, or hydrogen chloride, HCl; sulfide: hydrogen sulfide, $H_2S$; hydroxide: KOH, NaOH; sulfate: sulfuric acid, $H_2SO_4$; nitrate: Nitric acid, $HNO_3$, etc.), and/or other types of environmental parameters.

In some embodiments, a large surface to volume ratio (e.g., nanowires with diameter of 30 nanometer (nm) and length of 3 micrometer (μm)) of the nanowires ensures a fast (e.g., down to tens of seconds) and sensitive response. In various embodiments, the sensor size can vary within a wide range (e.g. ≥50 nm, ≥100 nm, ≥1 μm etc.). However, in preferred embodiments, the sensor size comprises nanometer or micrometer dimensions.

According to some embodiments, the readings of the corrosion detection device 100 can be obtained via a wired connection as can be appreciated. In other embodiments, readings of the corrosion detection device can be wirelessly communicated. Due to the operation principle of the corrosion detection device 100, which results in a resistive readout, the corrosion detection device can operate wirelessly. In one non-limiting example, the corrosion detection of the corrosion detection device 100 can be combined with known radio-frequency identification (RFID) technology for remote interrogation to determine the current condition of the nanowires 102. In another non-limiting example, the magnetic sensor signals of the magnetic sensor 104 can be interrogated with surface acoustic wave technology as can be appreciated.

EXPERIMENTS

In an experiment of a corrosion detection device 100 according to various embodiments, the magnetic nanowires 102 comprised iron nanowires with forty nanometer (nm) in diameter and about ten micrometer (μm) in length. The magnetic sensors of the corrosion detection device comprised tunnel magnetoresistance sensors. The magnetic nanowires were fabricated by electrodeposition into aluminum oxide templates.

For the experiment, the magnetic nanowires 102 (e.g., iron nanowires) were placed on top of magnetic sensors 104 (e.g., tunnel magnetoresistance sensors). Referring to FIG. 1, shown is an example of an electron microscopy image of the corrosion detection device 100 comprising the iron nanowires 102 placed on top of the magnetic sensors 104. FIG. 1 includes the corrosion detection device 100a before and the corrosion detection device 100b after heat treatment. During the experiment, the corrosion detection device 100 was put in an oven and heated up to about 150° C. to oxidize the iron thereby increasing the thickness of the iron oxide shell and reducing the diameter of the iron core.

Figure 2A:
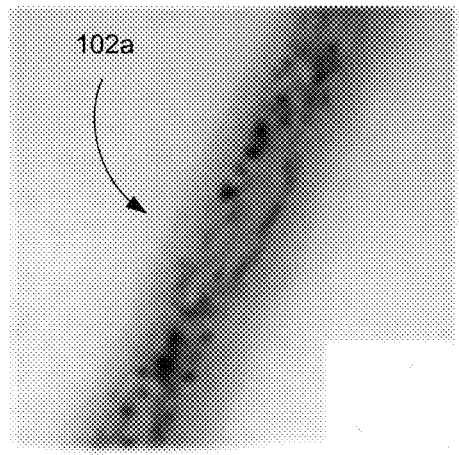
FIGS. 2A-2D are transmission electron microscopy images illustrating examples of the magnetic nanowires of the corrosion detection device of FIG. 1, in accordance with various embodiments of the present disclosure.
Figure 2B:
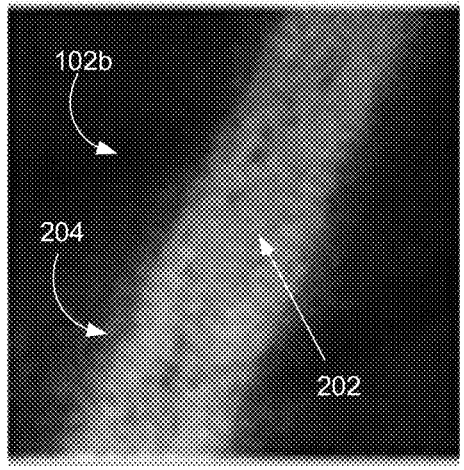
Figure 2C:
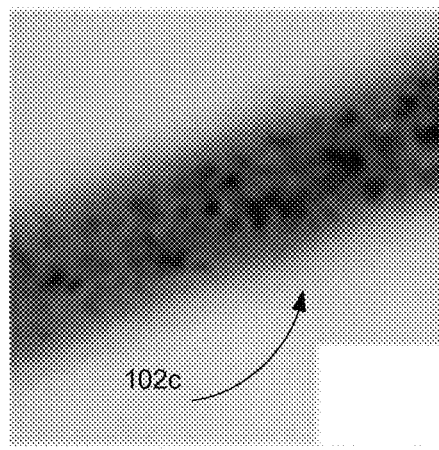
Figure 2D:
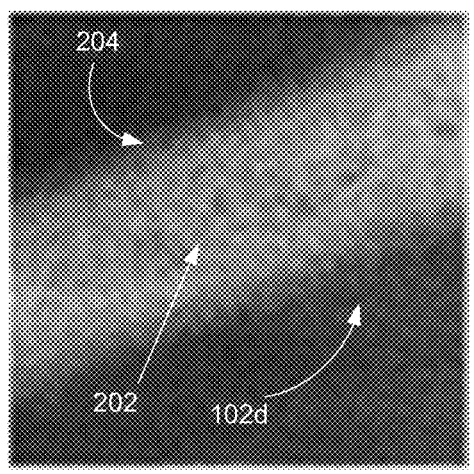

Referring to FIGS. 2A-2D, shown are examples of energy filtered transmission electron microscopy images of the magnetic nanowires 102 (e.g., 102a, 102b, 102c, 102d) before and after heat treatment illustrating size variations in the iron and iron oxide. In FIG. 2A, shown is an example of a bright field transmission electron microscopy image of the magnetic nanowires 102a prior to the heat treatment. In FIG. 2B, shown is an example of a coded energy filtered transmission electron microscopy image of the magnetic nanowire 102b via coded iron and oxygen prior to the heat treatment. As shown in FIG. 2B, the magnetic nanowire 102n before heat treatment has a large iron core 202 and a thin outer layer of native iron oxide 204. In FIG. 2C, shown is an example of a bright field transmission electron microscopy image of the magnetic nanowire 102c after the heat treatment. In FIG. 2D, shown is an example of a coded energy filtered transmission electron microscopy image of the magnetic nanowire 102d after the heat treatment. As shown in FIGS. 2C and 2D, the iron oxide shell 204 of the magnetic nanowire 102 grows while the iron core diameter of the magnetic nanowire 202 decreases during the heat treatment, until the entire nanowire 102 is oxidized.

Figure 3:
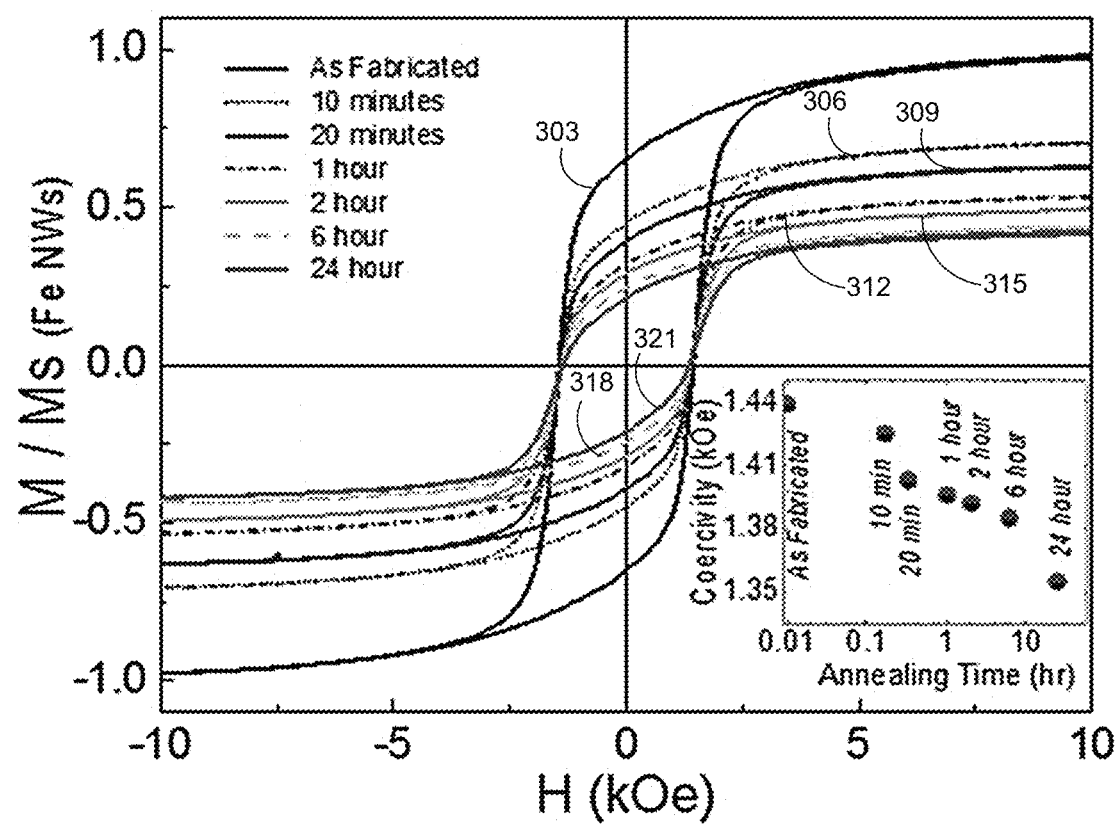
FIG. 3 is a graphical representation illustrating an example of magnetization curves of the magnetic nanowires of FIG. 1 before and after exposure to heat, in accordance with various embodiments of the present disclosure.

FIG. 3 is a graphical representation illustrating an example of magnetization curves of the magnetic nanowires of FIG. 1 before and after exposure to heat, in accordance with various embodiments of the present disclosure. As the magnetic nanowires 102 are exposed to the heat treatment, the magnetization of the nanowires 102 becomes weaker, as shown by the magnetization curves of FIG. 3. The magnetization curves of FIG. 3 illustrate iron nanowires 102 heated in an oven forming iron/iron oxide core/shell nanowires 102. As shown in FIG. 3, the magnetization of the nanowires 102 decreases the longer the nanowires 102 are exposed to the heat treatment. The magnetization curves represented in FIG. 3 correspond to the magnetization of the nanowires 102 as fabricated 303, after ten minutes 306, after twenty minutes 309, after one hour 312, after two hours 315, after six hours 318, and after twenty-four hours 321. Once the magnetic nanowires 102 are fully oxidized, the remaining magnetization is the one of iron oxide 204.

Figure 4:
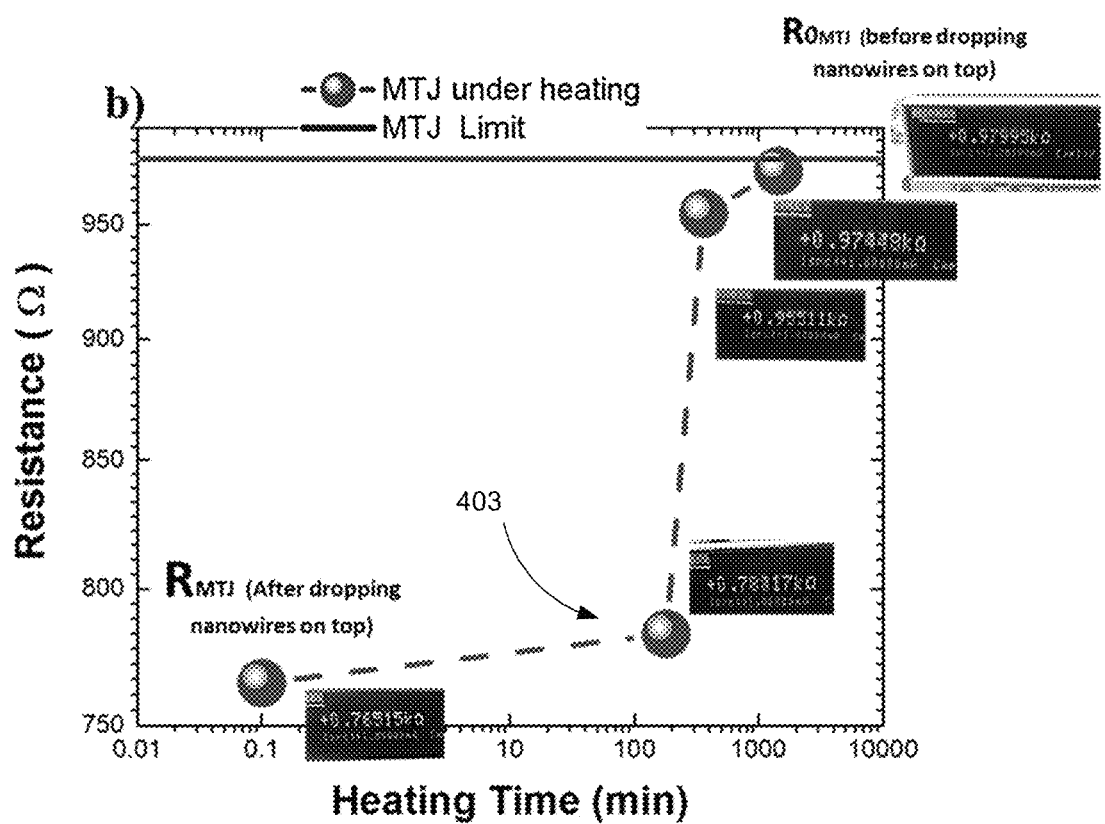
FIG. 4 is a graphical representation illustrating an example of the resistance response as a function of heating time of a magnetic sensor of the corrosion detection device of FIG. 1, in accordance with various embodiments of the present disclosure.

Turning now to FIG. 4, shown is a graphical representation of an example of the resistance response of a magnetic sensor 104 of the corrosion detection device 100 as a function of heating time, in accordance with various embodiments of the present disclosure. Specifically, FIG. 4 illustrates magnetic sensor readings 403 at several time points during the heat treatment at about 150° C. As the nanowires 102 corrode on top of the sensor 104, a significant change of the resistance of about thirty percent can be observed. It is important to note that the resistance change is not caused due to changes of the magnetic sensor, which was confirmed by reference measurements, but due to a change in the magnetic properties of the nanowires which are measured remotely via the magnetic sensor. Hence, electrical contact is neither employed nor needed with the material that corrodes, which is a major difference to existing resistive corrosion measurement techniques.

It is further important to note that this specific experiment was carried out at 150° C. to test the working principle, but a similar response (different dynamics and values) is expected from other corrosive environments including chemicals, humidity, and/or other corrosive environments as well as at room temperature.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A corrosion detection device, comprising:
a first electrode;
a magnetic sensor located on the first electrode;
a second electrode located on the magnetic sensor; and
one or more magnetic nanowires disposed on the second electrode of the magnetic sensor, wherein the magnetic sensor is configured to detect corrosion of the one or more magnetic nanowires based at least in part on a magnetic field of the one or more magnetic nanowires.

2. The corrosion detection device of claim 1, wherein the magnetic sensor comprises a tunnel junction sensor, a magnetoresistance sensor, a magnetoimpedance sensor, or a Hall sensor.

3. The corrosion detection device of claim 1, wherein the one or more magnetic nanowires comprise iron, nickel, cobalt, or one or more alloys.

4. The corrosion detection device of claim 1, wherein an output of the magnetic sensor is a function of a corrosiveness of a surrounding environment.

5. The corrosion detection device of claim 1, wherein the magnetic sensor is designed to detect one or more environmental parameters comprising at least one of heat, humidity, or one or more chemicals.

6. The corrosion detection device of claim 1, wherein the corrosion of the one or more nanowires causes the magnetization of the one or more nanowires to decrease.

7. The corrosion detection device of claim 1, wherein the magnetic sensor is interrogated via radio-frequency identification (RFID).

8. The corrosion detection device of claim 1, wherein the magnetic sensor is interrogated via a surface acoustic wave.

9. A method for detecting corrosion, the method comprising:
placing one or more magnetic nanowires on a top electrode of a magnetic sensor to form a corrosion detection device, wherein the magnetic sensor is sandwiched between a bottom electrode and the top electrode;
attaching the corrosion detection device to a material structure;
obtaining one or more outputs of the magnetic sensor;
determining corrosion of the one or more magnetic nanowires based at least in part on the one or more outputs, wherein a magnetization of the one or more magnetic nanowires decreases as the one or more magnetic nanowires corrodes; and
determining that a surrounding environment of the material structure is a corrosive environment based at least in part on the corrosion of the one or more magnetic nanowires.

10. The method of claim 9, wherein the magnetic sensor comprises a tunnel junction sensor, a magnetoresistance sensor, a magnetoimpedance sensor, or a Hall sensor.

11. The method of claim 9, wherein the one or more magnetic nanowires comprises iron, nickel, cobalt, or one or more alloys.

12. The method of claim 9, wherein the magnetic sensor operates wirelessly.

13. The method of claim 9, wherein the corrosion detection device is embedded within the material structure.

14. The method of claim 9, wherein the corrosion detection device is attached to an exposed surface of the material structure.

15. A system for detecting corrosion, the system comprising:
a material structure; and
a corrosion detection device attached to the material structure, the corrosion detection device comprising:
a first electrode;
a magnetic sensor located on the first electrode;
a second electrode located on the magnetic sensor; and
at least one nanowire located on the second electrode of the magnetic sensor, the magnetic sensor being configured to detect corrosion of the at least one nanowire, and the output of the magnetic sensor being a function of a corrosiveness of a surrounding environment of the material structure.

16. The system of claim 15, wherein the magnetic sensor comprises a tunnel junction sensor, a magnetoresistance sensor, a magnetoimpedance sensor, or a Hall sensor.

17. The system of claim 15, wherein the at least one nanowire comprises iron, nickel, cobalt, or one or more alloys.

18. The system of claim 15, wherein the magnetic sensor is configured to detect corrosion of the at least one nanowire based at least in part on a magnetic field of the at least one nanowire.

19. The system of claim 15, wherein the corrosion of the at least one nanowire causes the magnetization of the at least one nanowire to decrease.

20. The system of claim 15, wherein the correction detection device is embedded within the material structure.

\* \* \* \* \*